United States Patent
Jamkhedkar et al.

(10) Patent No.: US 11,336,453 B2
(45) Date of Patent: May 17, 2022

(54) TRANSACTIONS BETWEEN SERVICES IN A MULTI-TENANT ARCHITECTURE

(71) Applicant: PayPal, Inc., San Jose, CA (US)

(72) Inventors: Prashant Jamkhedkar, Fremont, CA (US); Aravindan Ranganathan, San Jose, CA (US); Sandeep Kumar, Fremont, CA (US); Norihiro Aoki, San Jose, CA (US); Justin White, La Selva, CA (US); Jeffrey Meyer, Los Gatos, CA (US); Kin Kee, Alameda, CA (US); Joshua Knox, Palo Alto, CA (US); Satya Ganesh Simhachalam Malla Venkata, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 107 days.

(21) Appl. No.: 16/457,822

(22) Filed: Jun. 28, 2019

(65) Prior Publication Data
US 2019/0386831 A1 Dec. 19, 2019

Related U.S. Application Data

(63) Continuation-in-part of application No. 16/009,994, filed on Jun. 15, 2018, now Pat. No. 11,030,329.

(51) Int. Cl.
*H04L 9/32* (2006.01)
*G06F 9/50* (2006.01)

(52) U.S. Cl.
CPC .......... *H04L 9/3234* (2013.01); *G06F 9/5011* (2013.01); *H04L 9/3247* (2013.01); *H04L 9/3297* (2013.01)

(58) Field of Classification Search
None
See application file for complete search history.

(56) References Cited

U.S. PATENT DOCUMENTS 7,657,639 B2  2/2010 Hinton
8,271,536 B2  9/2012 Amradkar et al.
(Continued)

OTHER PUBLICATIONS

Solanki, Nidhiben et al. "Multi-Tenant Access and Information Flow Control for SaaS" [online] IEEE, Jun. 27, 2016 [retrieved Mar. 4, 2021]. Retrieved from the Internet: URL: https://ieeexplore.ieee.org/document/7557990 (Year: 2016).*

(Continued)

*Primary Examiner* — Taghi T Arani
*Assistant Examiner* — Joshua Raymond White
(74) *Attorney, Agent, or Firm* — Kowert, Hood, Munyon, Rankin & Goetzel, P.C.

(57) ABSTRACT

A method for facilitating transactions between tenants in a multi-tenant architecture system is discussed. The method includes receiving a request, at a multi-tenant platform, from a first service of a first tenant of the multi-tenant platform to access a second service of a second tenant of the multi-tenant platform to perform a transaction, in which the request includes a first access token usable to authenticate the transaction with the first tenant. The method includes generating, by the multi-tenant platform using the first access token, a universal access token. The method includes generating, by the multi-tenant platform using the universal access token, a second access token useable to authenticate the transaction with the second tenant. The method includes using, by the multi-tenant platform, the second access token to communicate with the second service to perform the transaction.

18 Claims, 9 Drawing Sheets

(56) References Cited

U.S. PATENT DOCUMENTS

| | | | |
|---|---|---|---|
| 8,819,801 | B2 | 8/2014 | Sangubhatla et al. |
| 8,918,641 | B2 | 12/2014 | Smith et al. |
| 9,058,481 | B2 | 6/2015 | Prasad et al. |
| 9,218,599 | B1 | 12/2015 | Hilbring |
| 9,710,664 | B2 | 7/2017 | Sathyadevan et al. |
| 9,781,122 | B1 | 10/2017 | Wilson et al. |
| 10,931,656 | B2* | 2/2021 | Carru ............ H04L 63/08 |
| 2002/0010591 | A1 | 1/2002 | Pomerance |
| 2004/0117298 | A1 | 6/2004 | Algiene et al. |
| 2006/0059565 | A1 | 3/2006 | Green et al. |
| 2007/0150480 | A1 | 6/2007 | Hwang et al. |
| 2008/0154783 | A1 | 6/2008 | Rule et al. |
| 2009/0125972 | A1* | 5/2009 | Hinton ............ G06F 21/41 726/1 |
| 2011/0276892 | A1 | 11/2011 | Jensen-Horne et al. |
| 2012/0072307 | A1 | 3/2012 | Kassaei et al. |
| 2012/0197963 | A1 | 8/2012 | Bouw et al. |
| 2013/0046600 | A1 | 2/2013 | Coppinger |
| 2013/0318241 | A1 | 11/2013 | Acharya et al. |
| 2014/0230076 | A1 | 8/2014 | Micucci et al. |
| 2015/0161620 | A1 | 6/2015 | Christner |
| 2015/0193775 | A1 | 7/2015 | Douglas et al. |
| 2015/0193858 | A1 | 7/2015 | Reed et al. |
| 2016/0087960 | A1 | 3/2016 | Pleau et al. |
| 2016/0337365 | A1 | 11/2016 | Beiter |
| 2017/0012962 | A1* | 1/2017 | Lissack ............ G06F 16/951 |
| 2017/0048306 | A1 | 2/2017 | Amador |
| 2017/0318128 | A1 | 11/2017 | Ananthanarayanan et al. |
| 2018/0013763 | A1 | 1/2018 | Wilson et al. |
| 2018/0075231 | A1 | 3/2018 | Subramanian et al. |
| 2018/0081905 | A1 | 3/2018 | Kamath et al. |
| 2019/0014120 | A1 | 1/2019 | Drabant |
| 2019/0026486 | A1 | 1/2019 | Pleau et al. |
| 2020/0007529 | A1* | 1/2020 | Bahrenburg ............ H04W 12/08 |
| 2020/0412538 | A1* | 12/2020 | Rosado ............ H04L 9/3247 |

OTHER PUBLICATIONS

International Appl. No. PCT/US2019/037242, International Preliminary Report on Patentability dated Dec. 24, 2020, 12 pages.

International Appl. No. PCT/US2019/037242, International Search Report and Written Opinion dated Oct. 4, 2019, 12 pages.

Ashwini A., "What Are the Pros and Cons of Muititenancy in Rails Application?", [online], Retrieved from the Internet: https://rnedium.com/swlh/what-are-the-pros-and-cons-of-multi-tenancy-in-railsapplication, Apr. 30, 2018, 9 pages.

Crown N., "An Introduction to SCIM: System for Cross-Domain System for Cross-Domain IdentityManagement", RSA Conference Europe 2012 [online], Retrieved on Apr. 24, 2018, Retrieved from the Internet: URL: https://www.rsaconference.comtwritable/presentations/file.../iam-107a_crown.pdf, 24 pages.

"Single tenant vs Multi tenant business softwarecommunifire" axero Online, Retrieved on Apr. 30, 2018, Retrieved from the internet : URL:http://axerosolutions.com/blogs/timeisenhauer/pulse/146/single-tenent-vs-multi-tenant-business-software, 9 Pages.

International Appl. No. PCT/US2019/064325, International Search Report and Written Opinion dated Mar. 24, 2020, 16 pages.

Johnes M., et al., "JSON Web Token (JWT)," May 2015, 30 pages.

Kabbedijk J. et al., "Multi-Tenant Architecture Comparison", [Online], Retrieved on Apr. 30, 2018. Retrieved from the Internet: URL: https://pdfs.semanticschoiar.org/17fb/e778244aa190da9d56c5fb8c2e64c63cd621.pdf, 8 pages.

Li K. et al., "System for Cross-domain Identity Management: Definitions, Overview, Concepts, and Requirements" [online], retrieved on Apr. 24, 2019, Retrieved from the internet: URL: https://tools.ietf.org/html/ric7642, 19 pages.

Microsoft Application Architecture Guide, Chapter 2: Key Principles of Software Architecture, 2nd Edition—Retrieved from the internet: URL: https://docs.microsoft.com/en-us/previous-versions/msp-np/ee658124%28v%3dpandp.10%29, Oct. 2009, [Online], Retrieved on Apr. 30, 2018.

"Muiti-tenant Vs. Single-tenant Architecture (SaaS)" Online, retrieved on Apr. 30, 2018, Retrieved from tile Internet: URL: https://blogs.sap.com/2015/07/12/multi-tenant-vs-single-tenant-architecture-saas/, 5 pages.

"Multi-tenancy is fundamental to SaaS aPages.lications- and it's better for your, too" Sage Intacct Online, Retrieved on Apr. 30, 2018. Retrieved from the Internet: URL: https://www.sageintacct.com/cloud-erp/multi-tenant-cloudarchitecture, 4 Pages.

European Application No. 19819808.7, Extended European Search Report dated Jun. 8, 2021, 7 pages.

International Application No. PCT/US2019/064325, International Preliminary Report on Patentability dated Jun. 17, 2021, 6 pages.

International Application No. PCT/US2019/068999, International Search Report and Written Opinion dated Mar. 31, 2020, 8 pages.

International Search Report and Written Opinion for International Application No. PCT/US2019/68993 dated Mar. 31, 2020, 14 pages.

International Search Report and Written Opinion for International Application No. PCT/US2019/68999 dated Mar. 31, 2020, 14 pages.

* cited by examiner

TRANSACTIONS BETWEEN SERVICES IN A MULTI-TENANT ARCHITECTURE

The present application is a continuation-in-part of U.S. application Ser. No. 16/009,994, filed Jun. 15, 2018; the disclosure of the above-referenced application is incorporated by reference herein in its entirety.

BACKGROUND

Embodiments of the present disclosure generally relate to the field of software architecture and, more particularly, to managing how various entities are on-boarded, managed, and/or accessed in a multi-tenant system architecture.

Complex software systems can have various architectures, including a single-tenant software architecture and a multi-tenant software architecture, among others. In a single-tenant software architecture, each entity (such as a company or a portion of that company) can have their own instances of each software application, data, and any supporting infrastructure. In a single-tenant architecture, the software for each tenant entity can be customized as desired. However, drawbacks of using the single tenant architecture include expense in resources, as well as requirements to host, customize, and maintain separate software applications for each tenant.

In contrast, in a multi-tenant software architecture, each entity can share the same instances of applications, data, and/or infrastructure. A multi-tenant software provider can provision their applications and/or resources to multiple entities from a single software architecture. In multi-tenant software architecture, access to data can be shared among the various entities. By sharing much of the applications, data, and software; various resources such as installation, configuration, number of physical servers, maintenance, and even power can be optimized. However, drawbacks of using multi-tenant architecture include complexity of managing how multiple software applications are configured and shared among multiple clients. Also, design of multi-tenant architecture-based software systems that provides secure and reliable access to the data can be problematic. Furthermore, interoperability difficulties may arise when using software applications, in a multi-tenant architecture system, that were initially managed and/or hosted by different businesses.

BRIEF DESCRIPTION OF THE DRAWINGS

The present embodiments may be better understood, and numerous objects, features, and advantages made apparent to those skilled in the art by referencing the accompanying drawings.

Figure 1:
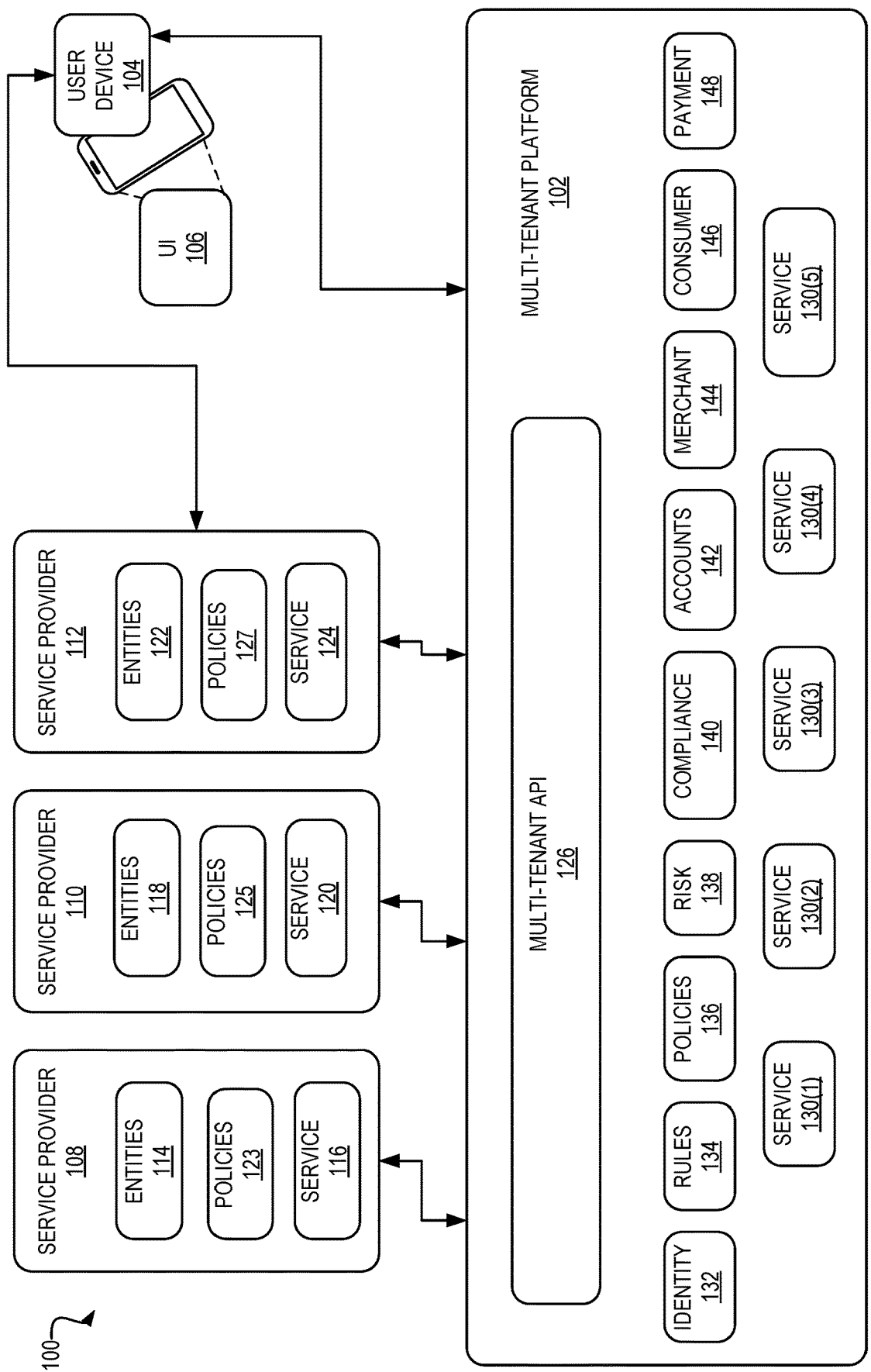
FIG. 1 is a system diagram illustrating embodiments of a multi-tenant software architecture system that can be accessed by communicating with a user device.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" service providers would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The description that follows includes exemplary systems, methods, techniques, instruction sequences, and/or computer program products that embody techniques of the present disclosure. However, it is understood that the described embodiments may be practiced without these specific details. For instance, although some examples refer to accessing tenant services, other types of service providers are contemplated, such as of Software-as-a-Service (SaaS), among others.

In a multi-tenant software architecture described herein, each tenant can share the applications, data, and/or infrastructure. A multi-tenant software provider can use a multi-tenant software platform to provision applications and/or resources to multiple entities. The multi-tenant software platform can facilitate addition of new tenants and on-board data and/or services provided by these new tenants. The multi-tenant software platform can use identity services to provide access to these services, such as from an entity associated with one tenant to a service provided by another tenant. The multi-tenant software platform can also implement rules and policies for data access by various entities across the tenants (e.g., access by a first service of a first tenant to access a second service of a second tenant to perform a transaction).

The multi-tenant software platform (also referred to as a multi-tenant platform) can include multiple tenants that have been previously on-boarded. The multi-tenant platform can facilitate access, using a unified identity associated with a user, to the entities, policies, and services of these tenants. The tenants can be hosted and managed by service providers. Access to the services can be determined based on privileges of the unified identity, as well as on policies of each of the tenants. The services can include various merchant services, such as in-store check-out (at a certain tenant) via a user device (associated with the unified identity), access to an online store of the tenant, order-ahead at a certain store of the tenant, a cash-in process (e.g., at an Automated Teller Machine (ATM)) at a certain tenant, a cash-out process (e.g., at an ATM), self-checkout for fuel at pay-at-the-pump stations of the tenant, securely storing funding instruments for use in transactions (also referred to as vaulting funding instruments), among others. The services can include SaaS and Platform as a Service (PaaS) services and/or other cloud services that are accessible by the user device. For example, the solution provider can provide access, to the user device, to various software applications, or deliver such software to the user device.

The multi-tenant platform can thus utilize unified identity services to provide access to selected services and/or data of the tenants based on policies associated with each of the tenants. The multi-tenant platform can use separate databases to store data to achieve isolation, such as when new tenants are on-boarded onto the existing platform, and providing logical and/or physical data isolation. Shared data access can be made possible by on-boarding the tenants and selectively cross-exposing services. For example, for a multi-tenant platform managed by PAYPAL, certain capabilities of the multi-tenant platform such as Risk-as-a-Service (RaaS) can be provided to certain users of on-boarded tenants such as XOOM. Similarly, certain capabilities of XOOM such as Fund Sending can be provided to certain users of PAYPAL and capabilities of BRAINTREE such as Vaulting can be provided to certain users of PAYPAL. Thus, in some embodiments, the multi-tenant platform can include a core tenant (such as PAYPAL) that offers core services and infrastructure (including Identity-as-a-Service (IaaS) functionality) and any additional data access to selected tenants and/or users accessing the multi-tenant platform from that tenant. The techniques disclosed herein, however, are not limited to providing access from a core tenant to another tenant. In various embodiments, any service of any tenant can be accessed by a service of another tenant subject to rules and/or policies as discussed herein. The level of access to the core services and/or infrastructure (or access to a tenant's services by services of other tenants) can be determined by rules and/or policies of each tenant and/or of the multi-tenant platform.

The multi-tenant platform can onboard new tenants as needed by using a one or more hierarchical data structures. In some embodiments, the multi-tenant platform can expose appropriate user experiences for a user application based on the user request. The multi-tenant platform can implement methods for providing IaaS services to various entities and/or tenants. The multi-tenant platform can provide the IaaS and other services based on the hierarchical data structures. As discussed below, the multi-tenant platform can process user requests (e.g., from users of the core tenant or from users of an on-boarded tenant) and determine how to access a certain service.

In some embodiments, the multi-tenant platform can receive a request, at a first service provider, to provide a service for a user. The multi-tenant platform can access a representation of a second service provider in a first hierarchical data structure managed by the first service provider. In some embodiments, the multi-tenant platform is the first service provider that can provide certain services to entities that are referenced via identifiers determined using IaaS. The multi-tenant platform can determine that user data required for the service is managed by the second service provider that manages user identity of the user. The multi-tenant platform can determine that the representation is linked with a full identity reference for the second service provider in a second hierarchical data structure managed by the second service provider. The multi-tenant platform can access the user data at the second hierarchical data structure using the full identity reference. The multi-tenant platform can access the service via the lightweight identity reference and using the user data at the first service provider. The following description and associated Figures illustrate various embodiments directed to the ideas listed above.

FIG. 1 is a system diagram illustrating embodiments of a multi-tenant software architecture system that can be accessed by communicating with a user device. In an overview of the system diagram 100, a user device 104 can communicate with multi-tenant platform 102. The multi-tenant platform 102 can provide access to multiple service providers 108, 110, and 112. The multi-tenant platform 102 includes core services at elements 132-148, as well as additional services 130(1)-130(5). The multi-tenant platform 102 can provide services to the service providers 108-112, such as IaaS services that may be required for accessing other services. In various embodiments, the multi-tenant platform 102 can facilitate accesses by a service 116, 120, 124 of a service provider 108, 110, 112 to a service 116, 120, 124 of another service provider 108, 110, 112 (e.g., facilitating access by service 116 of service provider 108 to service 124 of service provider 112). Thus, the multi-tenant platform 102 can manage a plurality of tenants, each one of which can be associated with one or more services, which are then exposed for access. In various embodiments, multi-tenant platform 102 is implemented using a computer system (e.g., a laptop computer, a desktop computer, a server) or a plurality of computer systems (e.g., a cloud of servers).

The multi-tenant platform 102 can store user information for users at the accounts 142. In some embodiments, the accounts 142 includes information for users (also referred to as "core users") of a core tenant. The core tenant can be one of the service providers 108-112, or a service provider that is fully integrated into the multi-tenant platform 102. The multi-tenant platform 102 can facilitate provision of various core services to the core users. The core services can include identity services 132, risk services 138, compliance services 140, and payment services 148. In one embodiment, the multi-tenant platform 102 provides IaaS services at the identity services 132 element. The identity services 132 can generate and maintain a core hierarchical data structure for managing its core entities. The core services can also include access to policy configuration 136, as well as access to accounts 142, merchants 144, and consumers 146. The accounts 142 are associated with the identity services 132.

The service provider 108 can include entities 114, policies 123, and services 116. Similarly, the service providers 110 and 112 include certain elements of entities 118 and 122, policies 125 and 127, and services 120 and 124, respectively. In some embodiments, a certain service provider can be fully integrated onto the multi-tenant platform 102, a process which can include generating the core hierarchical data structure for the core tenant. In this example, the identity services 132 can manage the core users, meaning that the service provider 108 does not have its own identity service for its own users. Alternatively, the service providers 108, 110, and 112 can be on-boarded onto the multi-tenant platform 102 and manage their own identities. Any access from a service provider 108, 110, 112 for access of a service other than its own services 116, 120, 124; such as access of a service 130(1) or access to a service 116, 120, 124 of another service provider 108, 110, 112; uses a unified identity for access of services and/or data across the multi-tenant platform 102, in various embodiments.

The multi-tenant platform 102 can onboard the service providers 108, 110, 112. As discussed below, the onboarding process can include accessing identity services of the services providers 108, 110, 112 to determine at least a portion of the entities that are being managed by the respective identity service. If the entities are not being migrated (e.g., by being fully integrated) to the identity services 132, then the identity services 132 can generate representations (also referred to herein as models) of the entities being on-boarded in the core hierarchical data structure. In various embodiments, these representations are then used by the IaaS service to determine and use the unified identity (for a certain user) across the multi-tenant platform 102. The representations can include lightweight elements and/or linked elements. The identity services 132 can manage and access the policy configuration 136, such as to enforce access to certain customer and/or merchant domains. The policy configuration 136 can be accessed via the hierarchical data structures (discussed below) for each entity. The process of generating and using user representations is explained in more detail below.

The multi-tenant platform 102 can communicate, via the multi-tenant API 126, with the service providers 108, 110, 112 and/or the user device 104. The multi-tenant platform 102 can provide, based on a certain unified identity, information related to a tenant, associated services, and/or associated user experiences, to a requesting entity via the multi-tenant API 126. Furthermore, the multi-tenant platform 102 can facilitate communication between various service providers 108, 110, 112, such as by providing IaaS services and use of unified identity. In various embodiments, multi-tenant API 126 includes one or more API gateways 126(1), 126(2), etc. (not shown) executable to interface with respective service providers 108, 110, 112 by, for example, handling protocol translations between the multi-tenant API 126 and the various service providers 108, 110, 112. In some embodiments, for example, multi-tenant API 126 includes a first API gateway 126(1) executable to translate protocols between service provider 108 and multi-tenant API 126 and a second API gateway 126(2) executable to translate protocols between service provider 110 and multi-tenant API 126. In various embodiments, such API gateways 126($n$) are implemented as components of API gateway 126 but in other embodiments may be implemented as separate instances of API gateway 126.

For example, a new tenant, such as the service provider 112, can be on-boarded by the multi-tenant platform 102. Information on the new tenant can be stored by one or more of the core services 132-148. In some embodiments, one or more of services of the new tenant, such as the service 124, can be exposed for access to other users of the multi-tenant platform 102. In one embodiment, the multi-tenant platform 102 can also generate a representation 130(5) of the service 124 at the multi-tenant platform 102. Thus, any access from other tenants, such as from the user device 104 or from the service provider 110), to the service 124 is performed via a unified identity (e.g., by using IaaS) at the service representation 130(5). As discussed herein, such accesses include the use of a universal access token (UAT) in various embodiments.

The user device 104 can be any type of a computing device that can communicate user requests to the multi-tenant platform 102. The user device 104 can be implemented as a kiosk, a point-of-sale (PoS) terminal, a mobile device, among others. The user device 104 includes a user interface (UI) 106 through which the user can interact with displayed user experiences, such as to access certain services provided via the multi-tenant platform 102. The user device 104 can generate and communicate a user request for a certain service at the multi-tenant platform 102. The user device 104 can interface with the multi-tenant API 126, which can interface with various other components of the multi-tenant platform 102.

In some embodiments, one of the tenants, such as the core service provider 108, can implement one or more payment system functions. While the embodiments described in this paragraph relate to embodiments in which one of the tenants is a core service provider that is involved in a transaction between respective services of two tenants, in various other embodiments neither tenant in the transaction is a core service provider 108. In these embodiments, the core service provider (that is integrated into the multi-tenant platform 102) can process a payment and order fulfillment for services provided via user experiences accessed at the UI 106. The core service provider 108 can perform risk analysis (e.g., via the risk core service 138) to determine whether or not to perform a certain service and/or process a payment for that service. In some embodiments, the core service provider 108 can perform risk and/or verification services for the new service provider 112 (i.e., a new tenant) being on-boarded by the multi-tenant platform 102. The core service provider 108 can process payments from the user account that is associated with the user device 104. The core service provider 108 can provide financial services, such as a fund transfer (e.g., a transfer of a certain monetary amount), to the user. The core service provider can include payment accounts, each of which can be associated with a buyer or a seller. Once on-boarded as a core tenant, the accounts of the core service provider can be stored and accessed directly at the multi-tenant platform at the accounts 142 element. For example, a buyer (e.g., a user of the user device 104) can be associated with one payment account, and the seller (e.g., one of the tenants) can be associated with another payment account at the payment system. Upon successfully performing the risk analysis on the requested service (e.g., a requested transaction at the tenant), the core service provider can then perform (e.g., via the payment core service 148) a fund transfer from the buyer's payment account to the seller's payment account.

In various embodiments, two tenants (e.g., two of service providers 108, 110, and 112) can engage in transactions between their respective services as discussed in further detail herein in reference to FIGS. 5, 6A, 6B, and 7. In such embodiments, multi-tenant platform 102 receives (via multi-tenant API 126) a request from a first service (e.g., one of services 116, 120, 124) of a first tenant (e.g., one of service providers 108, 110, 112) of the multi-tenant platform to access a second service (e.g., another of services 116, 120, 124) of a second tenant (e.g., another of services providers 108, 110, 112) to perform a transaction. In some embodiments, for example, the first service is a shopping cart service with which an end user identifies products for purchase from a merchant and the second service is a payment processing service that stores financial information relating to the end user and the merchant and is executable to transfer money from the end user to the merchant to pay for purchased products. As discussed herein, in various embodiments the first tenant and the second tenant have different systems by which the end user and merchant are identified and/or authenticated. In various embodiments, the request includes a first access token that is usable to authenticate the transaction with the first tenant, a universal access token is generated using the first access token, and a second access token useable to authenticate the transaction with the second tenant is generated using the universal access token, and the second access token is used to communicate with the second service to perform the transaction. Multi-tenant platform 102, therefore, is able to facilitate the transaction even though the first tenant and second tenant (and their respective services) have different identification and/or authentication systems that, for example, use different formats that require different or additional information.

The payment system can be implemented by PAYPAL or another online payment system that allows users to send, accept, and request fund transfers. In some embodiments, the user experience can also provide access to certain services. Thus, in addition, or instead of, a payment service, the user experience can include other functionality that is unique for the certain tenant, such as selection of items for order, access to certain SaaS functionality, the ability to vault various funding instruments with services implemented by BRAINTREE (a separate tenant), among others. Thus, the solution provider can provide funds in/funds out services, as determined based on the location data, from the payment system to the users of the user devices.

For simplicity, FIG. 1 only shows a single user device 104. However, as discussed herein, the multi-tenant platform 102 interfaces with multiple user devices, and thus provides access to services to many different users. Similarly, the multi-tenant platform 102 can onboard multiple tenants in addition to the ones shown. The multi-tenant platform 102 can also have multiple core tenants that are incorporated as part of the core services 132-148. As discussed herein, multi-tenant platform 102 facilitates an end consumer's ability to access checkout services via Merchants interfacing with different Service Providers (e.g., a first service provider for checkout and a second service provider for payment processing), in various embodiments.

Figure 2:
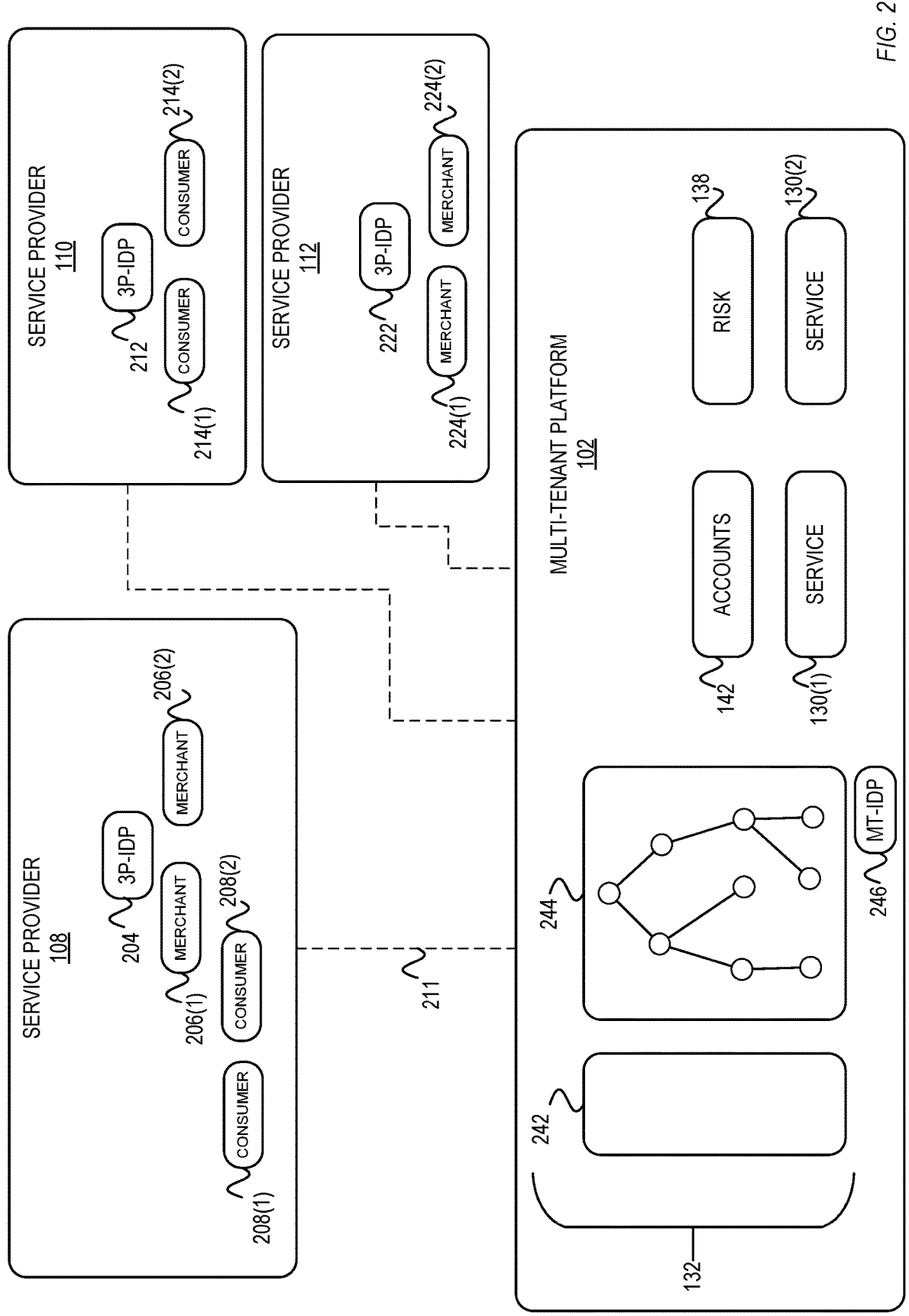
FIG. 2 is a system diagram illustrating embodiments of the multi-tenant software architecture of FIG. 1 including unified identity services.

FIG. 2 is a system diagram illustrating embodiments of the multi-tenant software architecture of FIG. 1 including unified identity services. FIG. 2 shows embodiments of how the identity services are implemented by each of the service providers 108-112, as well as by the multi-tenant platform 102. As shown, the service provider 108 can include a third-party identity provider (3P-IDP) 204 that manages entities of merchant 206(1) and 206(2), and entities of consumer 208(1) and 208(2). Similarly, the service provider 110 can include a 3P-IDP 204 that manages entities of consumer 214(1) and 214(2). The service provider 112 can include a 3P-IDP 222 that manages entities of merchant 224(1) and 224(2). The multi-tenant platform 102 includes the identity service 132, the accounts 142 element, the risk 138 element, as well as services 130(1) and 130(2). In some embodiments, the 3P-IDPs 204, 212, and 222 are representations (in the hierarchical data structure 244) of the actual IDPs provided by the service providers 108, 110, and 112.

In the embodiments shown in FIG. 2, the service provider 108 can be on-boarded by the multi-tenant platform 102, but not fully integrated. Thus, a link 211 is shown that indicates the on-boarded but not fully integrated status of the service provider 108. Alternatively, service providers can be fully integrated with the multi-tenant platform 102 by being made core to the multi-tenant platform 102. In various embodiments, identity service 132 includes an access tier 242 and the hierarchical data structure 244 that is managed by a multi-tenant identity provider (MT-IDP) 246. The multi-tenant platform 102 also includes services 138, 142, and 130(1)-130(2).

The access tier 242 is a part of the identity service 132 that customizes data associated with the service provider when being on-boarded with the multi-tenant platform 102. For example, the access tier 242 includes information about the products and/or services being offered by the service provider 108, as well as service endpoints for accessing services offered by the service provider 108. The service endpoints can be referenced by a corresponding node in the hierarchical data structure 244 for the service provider 108. Various embodiments of how the hierarchical data structure 244 is generated and accessed are discussed below with reference to FIGS. 3 and 4. In various embodiments, MT-IDP 246 can generate and manage representations of the entities of the service provider 108 being on-boarded (e.g., entities 206(1), 206(2), 208(1), and 208(2)). Similarly, MT-IDP 246 can generate and manage representations of entities for tenants of service providers 110 and 112.

Figure 5:
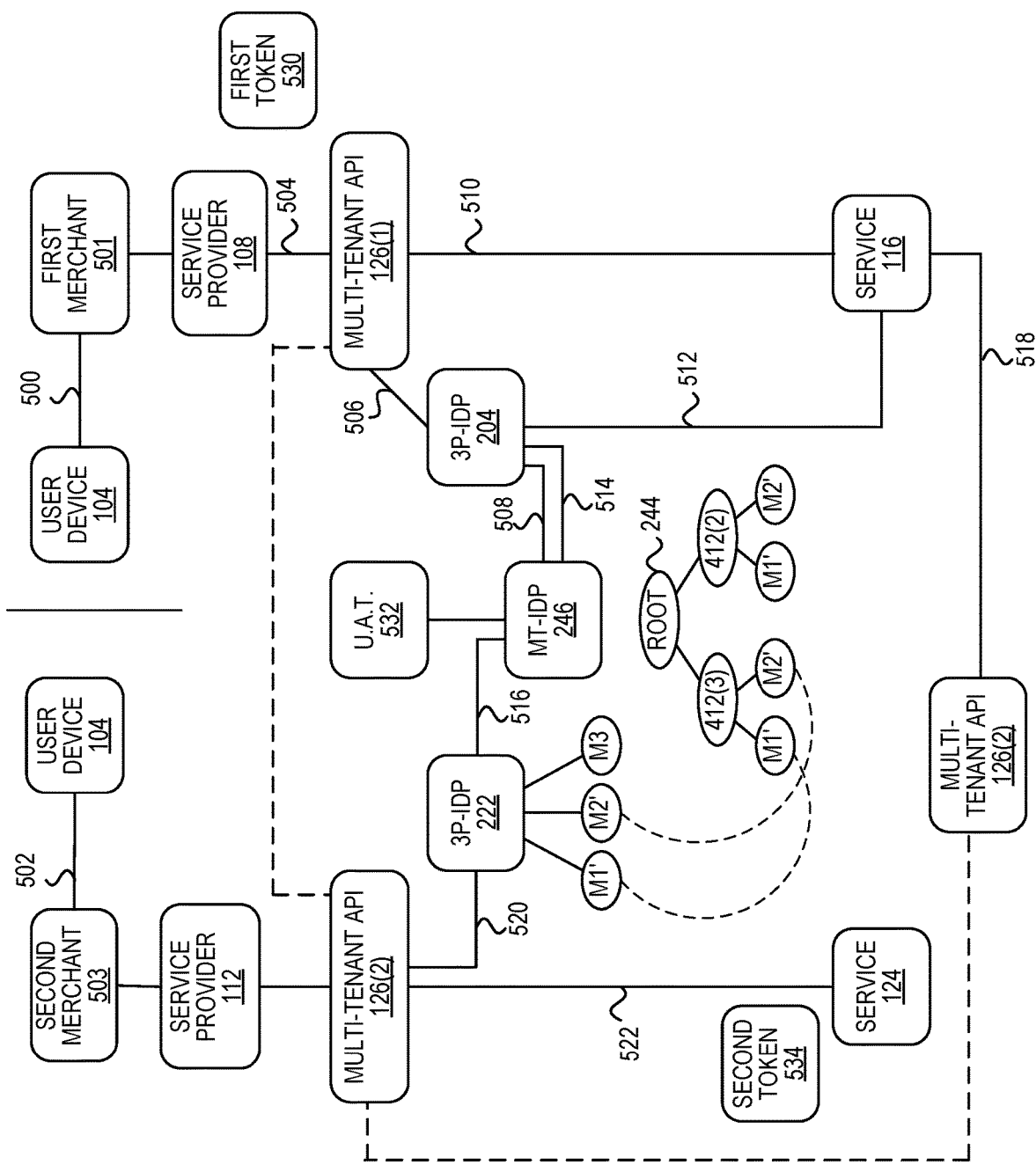
FIG. 5 is a flow diagram illustrating embodiments of operations for facilitating a transaction between services of tenants of a multi-tenant platform.

As discussed, since each of the service providers 108, 110, 112 includes its own 3P-IDP 204, 212, and 222 respectively, each of these tenants continues to manage the identities of their own respective entities. For example, the service provider 110 continues to manage the entities 214(1)-214(2), including managing identity information, contact data, and any characteristics of the consumers 214(1) and 214(2). The service provider 110 can update any changes to the entities 214(1) and 214(2) to the multi-tenant platform 102. These 3P-IDP 212 originated updates are used to keep the data of their respective representations up-to-date. Similarly, any services (such as core services) performed via the representations of the hierarchical data structure 244 are also propagated back to the 3P-IDP 212. As discussed further in reference to FIGS. 5, 6A, and 6B, in various embodiments, respective 3P-IDPs 204, 212, 222 manage access tokens and internal representation of access (also referred to herein as "security contexts") associated with their respective service providers (e.g., first access token 530 discussed with reference to FIG. 5 is exchangeable for security context by 3P-IDPs 204 204). In various embodiments, MT-IDP 246 is executable, using hierarchical data structure 244 and respective security contexts from 3P-IDPs 204, 212, 222, to generate a universal access token using the first token 530. Using the universal access token (e.g., universal access token 532 discussed with reference to FIG. 5), the 3P-IDP of the second service provider (e.g., 3P-IDP 222 or service provider 112) generates an access token for the second service provider that is useable to authenticate the transaction with the second service (e.g., second access token 534 discussed with reference to FIG. 5). In such embodiments, multi-tenant API 126 (shown in FIG. 1) is executable to use the second access token to communicate with the second service (e.g., another of services providers 108, 110, 112) to perform the transaction.

Figure 3:
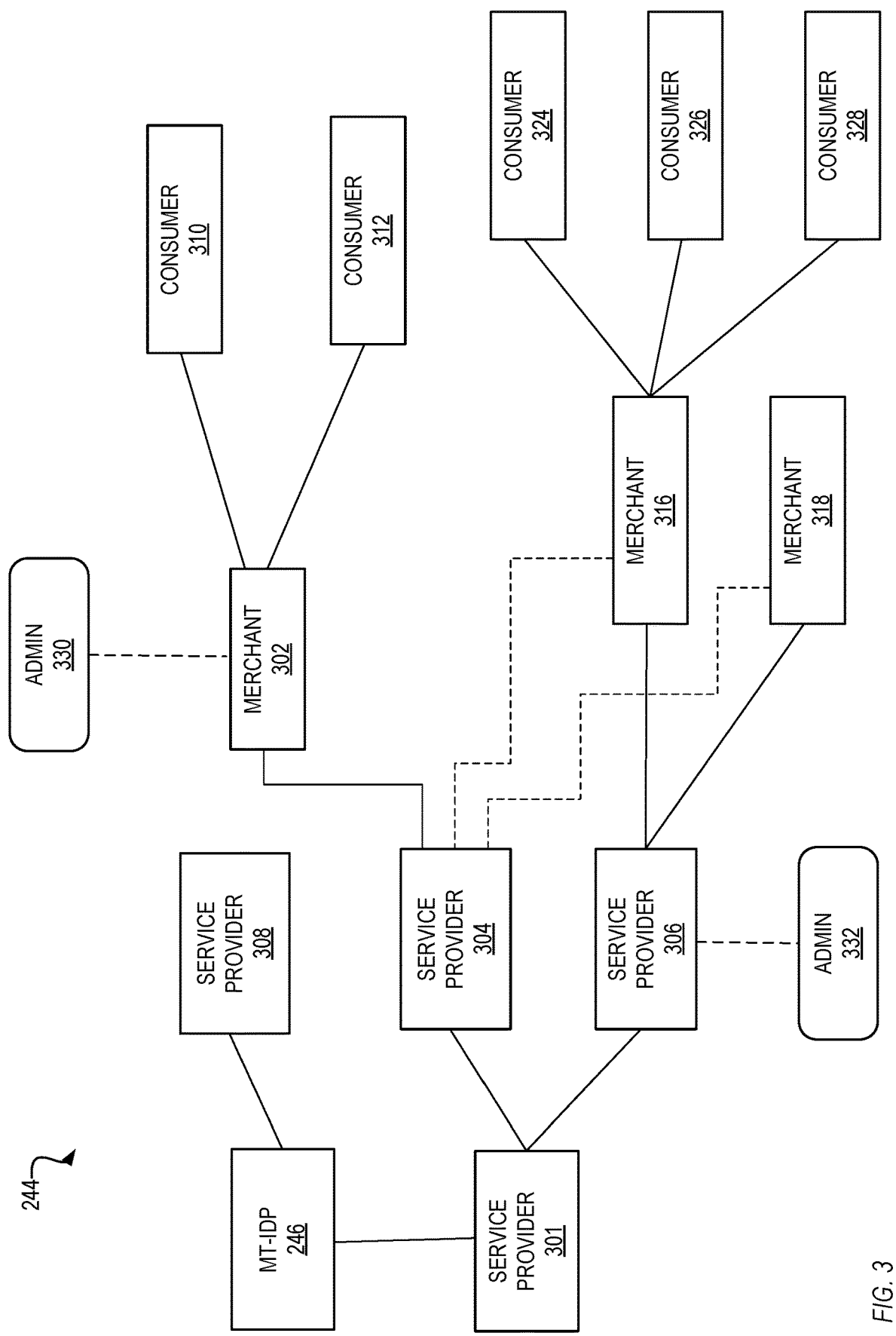
FIG. 3 is a diagram illustrating hierarchical data structures used by the multi-tenant software architecture systems that provide unified identity services.
Figure 4:
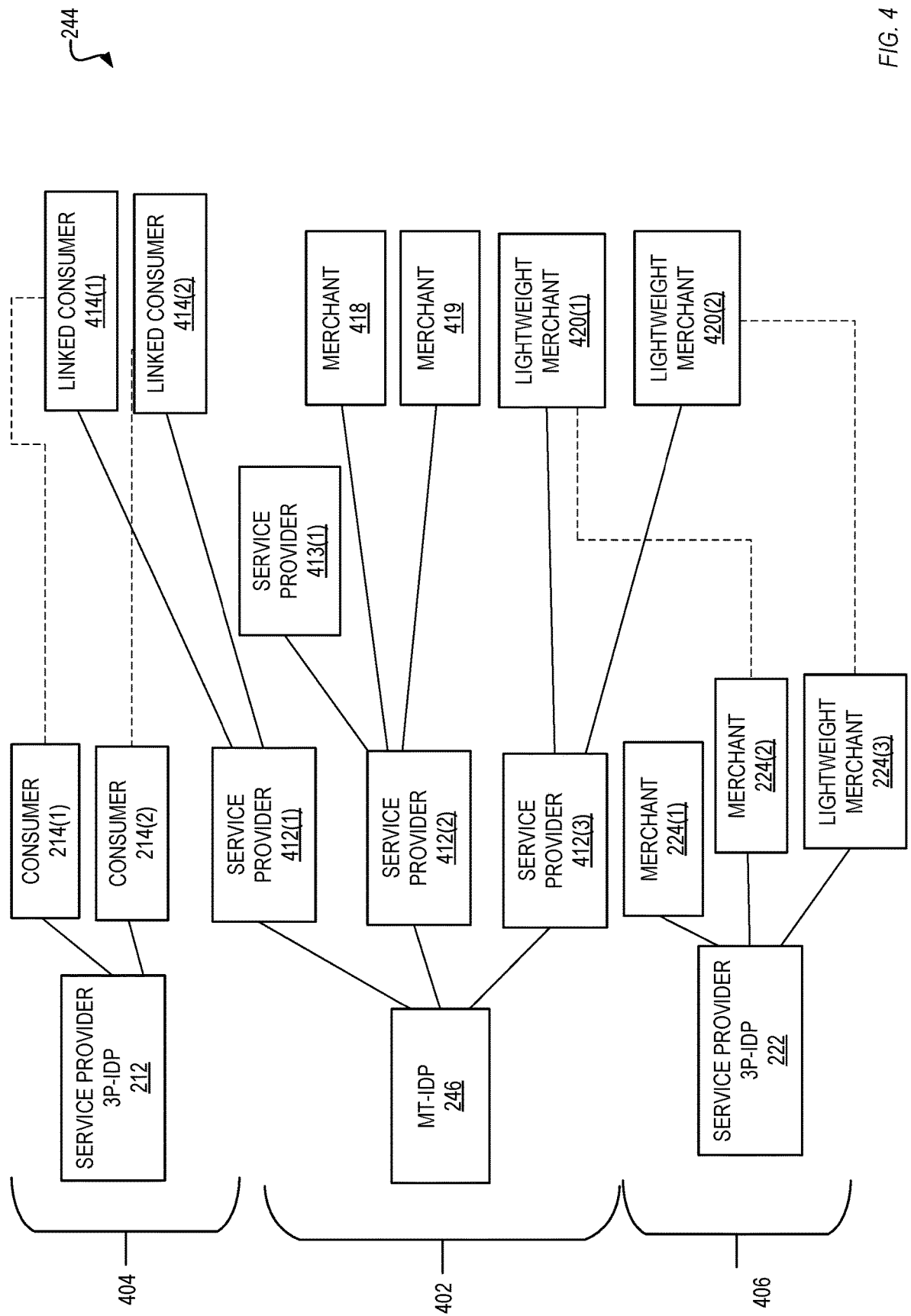
FIG. 4 is another diagram illustrating hierarchical data structures used by the multi-tenant software architecture systems that provide unified identity services.

FIG. 3 is a diagram illustrating a hierarchical data structure 244 used by multi-tenant platform 102 to provide unified identity services. FIG. 3 illustrates a hierarchical data structure 244 that is managed by the MT-IDP 246. In FIG. 3, there are no additional IDPs, and the entities 301, 302, 304, 306, 310, 312, 216, 318, 324, 326, and 328 are fully integrated into the multi-tenant platform 102. In FIG. 3, a first layer of hierarchy includes the service provider 301, which can correspond to the fully integrated core service provider 108 (e.g., PAYPAL), and an additional service provider 308, which represents a separate tenant (e.g., service provider 110 or 112) of multi-tenant platform 102. The organization and linking of the hierarchical data structure 244 of FIG. 3 can be referred to as a dependency graph. Although not shown in FIG. 3 (or FIG. 4), each of the merchants can include, as child nodes, a plurality of users such as consumers. Other nodes in FIGS. 3 and/or 4 can similarly have additional children nodes, as desired. As seen in FIGS. 3 and 4, the hierarchical data structure 244 can be used by the multi-tenant platform 102 to model various organizations including small merchant, large merchant, bring-your-own merchant, bring-your-own-customer, marketplaces, among others.

The next layers of hierarchy include the service providers 304 and 306. The service providers 304 and 306 can be on-boarded but not fully integrated. The service providers 304 and 306 can inherit policies and configuration from the service provider 301. The hierarchical data structure shows that the merchants 316 and 318 are child nodes of the node of the service provider 306, and thus are acted upon by the service provider 306. The service provider 306 (as inherited from the service provider 301 and modified by access permissions associated with the service provider 306) defines the permissions of the merchants, including how the merchants 316 and 318 can communicate with other entities of the hierarchical data structure including consumers of the merchant 316.

The hierarchical data structure shows that the consumers 310 and 312 are child nodes of the node of the merchant 302, and thus are acted upon by the merchant 302. The merchant 302 (as inherited from the service provider 301 and modified by access permissions associated with the merchant 302) defines the permissions of the consumers, including how the consumers 310 and 312 can communicate with other entities of the hierarchical data structure 244. For example, the merchant 302 can define that the consumer 310 can view its own profile, access certain core services (such as services 130(1) and 130(2)). The service provider 306 can be associated with small business merchants, and thus merchants 316 and 318 can each represent a small business merchant in the embodiment shown in FIG. 3.

The service provider 306 includes child nodes of merchants 316 and 318. The hierarchical data structure shows that the merchants 316 and 318 are linked to (but are not child nodes of) the service provider 304. Thus, the merchants 316 and 318 can be acted upon by the service provider 306, but can also be accessed (such as with read but not write privileges) by the service provider 304. An example of this is where the merchants 316 and 318 are two merchants that are operating as a part of the service provider 306 (which can implement a certain branch of PAYPAL). In this example, the service provider 304 can be a marketplace tenant such as EBAY that includes one entity (merchant 302), as well as links to two merchants 316 and 318. The service provider 306 (as inherited from the service provider 301 and modified by access permissions associated with the service provider 306) defines the permissions of the merchants, including how the merchants 316 and 318 can communicate with other entities of the hierarchical data structure including consumers of the merchant 316. It is noted that these links are used to link with nodes representing merchants 316 and 318, instead of using representations (as discussed below) since the same MT-IDP 246 manages all of the nodes of 316, 318, and 306. FIG. 3 also illustrates administrators 330 and 332 that have access to the merchant 302 and to the service provider 306, respectively. The administrator 330 and 332 can have various access permissions (such as ability to read configuration data).

FIG. 4 is another diagram illustrating hierarchical data structures 244 used by multi-tenant platform 102 to provide unified identity services. FIG. 4 illustrates several hierarchical data structures 402-406. The first hierarchical data structure 402 is managed by the MT-IDP 246. The second hierarchical data structure 404 is managed by the 3P-IDP 212, and the third hierarchical data structure 406 is managed by the 3P-IDP 232. FIG. 4 illustrates the relationships between the entities of the hierarchical data structures 402-406. The organization and linking of the hierarchical data structures of FIG. 4 can be referred to as a dependency graph. It is noted that the organization and type of the hierarchical data structures 404 and/or 406 is shown for illustrative purposes only, and that one or more of the 3P-IDP 212 and 222 can implement different data structures, as desired. In this case, the Identity-as-a-Service (IaaS) services can further map different schema used by the 3P-IDP 212 and/or 222 to the hierarchical data structure 402. It is also noted that the hierarchical data structure managed by the MT-IDP 246 is also shown for illustrative purposes only, and other implementations are contemplated. In some embodiments, the 3P-IDPs 212 and 222 are representations (in the hierarchical data structure 244) of the actual IDPs provided by the service providers 110 and 112.

In FIG. 4, the entities 412(1), 412(2), 412(3), 414(1). 414(2), 413(1), 416, 418, 419, 420(1), and 420(2) are fully integrated into the multi-tenant platform 102, and are managed by the MT-IDP 246. The entities 214(1) and 214(2) are not fully integrated into the multi-tenant platform 102, and are instead on-boarded onto the multi-tenant platform 102. The entities 214(1) and 214(2) are managed by the 3P-IDP 212. Similarly, the entities 224(1), 224(2), and 224(3) are on-boarded but not fully integrated into the multi-tenant platform 102. The entities 224(1), 224(2), 224(3) are managed by the 3P-IDP 232. In various embodiments, service provider 412(1) of FIG. 4 represents service provider 110 of FIG. 1 in hierarchical data structure 244, service provider 412(2) of FIG. 4 represents service provider 108 of FIG. 1 in hierarchical data structure 244, and service provider 412(3) of FIG. 4 represents service provider 112 of FIG. 1 in hierarchical data structure 244.

In various embodiments, multi-tenant platform 102 generates representations of merchant 418 and merchant 419 under service provider 412(2) (that are managed by MT-IDP 246). In various embodiments, merchant 418 represents a particular identity under service provider 412(2) (e.g., corresponding to a first particular account at service provider 108 that, for example, is associated with a first ecommerce storefront) and merchant 419 represents a separate identity under service provider 412(2) (e.g., corresponding to a second account at service provider 108 that, for example, is associated with a second ecommerce storefront). In various embodiments, an additional service provider 413(1) is also represented under service provider 412(2). In various embodiments, additional service provider 413(1) operates as a subpart of service provider 412(2) (e.g., as an ecommerce service provider operating within another ecommerce service provider such as ETSY operating as a subpart of PAYPAL). In such embodiments, additional service provider 413(1) has child nodes (not shown) representing merchants and/or consumers.

During the process of onboarding the service provider 110, the multi-tenant platform 102 can generate representations for the consumers 214(1) and 214(2) (that are managed by that tenant's 3P-IDP 212). The multi-tenant platform 102 can generate these representations by generating linked consumers 414(1) and 414(2). A linked consumer is an entity that represents a corresponding entity in another hierarchical data structure, and that contains a limited amount of the data for that corresponding entity. The linked consumers 414(1) and 414(2) link to the consumers 214(1) and 214(2), respectively.

Similarly, during the process of onboarding the service provider 112, the multi-tenant platform 102 can generate representations for the merchants 224(1) and 224(2) that are managed by that tenant's 3P-IDP 222. The multi-tenant platform 102 can generate these representations by generating lightweight merchants 420(1) and 420(2). A lightweight merchant is an entity that represents a corresponding entity in another hierarchical data structure, and that contains some of the data for that corresponding entity. The lightweight merchants 420(1) and 420(2) link to the merchant 224(2) and lightweight merchant 224(3), respectively. The types of representations can include a linked entities and lightweight entities. In some embodiments, a linked entity (e.g., a linked consumer or a linked merchant) is different from a lightweight entity (e.g., a lightweight merchant or a lightweight consumer) by is that the lightweight entity includes an additional amount of information for its corresponding entity, and the type can be chosen during onboarding.

The hierarchical data structure 402 indicates that the linked consumers 414(1) and 414(2) are child nodes of the node of the service provider 412(1), and thus are acted upon by the service provider 412(1). However, the service provider 412(1) does not directly modify the linked to consumers 214(1) and 214(2). Additionally, the hierarchical data structure 402 indicates that merchant 418 and merchant 419 are child nodes of the node of the service provider 412(2). Similarly, the hierarchical data structure 402 indicates that the lightweight merchants 420(1) and 420(2) are child nodes of the node of the service provider 412(3), and thus are acted upon by the service provider 412(3). However, the service provider 412(3) does not directly modify the linked to merchants 224(1) and 224(2). Additionally, merchant 418 is linked to lightweight merchant 420(1) and merchant is linked to lightweight merchant 420(2), indicating that these linked entities within hierarchical data structure 402 are associated with associated identities with service provider 108 and service provider 112, respectively (e.g., merchant 418 and lightweight merchant 420(1) are both controlled by the same person or group).

An example of this is where the merchants 224(1) and 224(2) are operating as merchants of a service provider 3P-IDP 222 (it is noted that for simplicity, both the 3P-IDP 222 and its service provider are shown as one box in FIG. 4, and similarly for the 3P-IDP 212), which can be a marketplace tenant. Although the lightweight merchants 420(1) and 420(2) inherit the access permissions from the service provider 412(2), the 3P-IDP 222 provides the access permissions to the merchants 224(1) and 224(2). In case of access permission conflict, the access permissions of the merchants 224(1) and 224(2) prevails.

As discussed in further detail in reference to FIG. 5, the hierarchical data structures 244 depicted in FIGS. 3 and 4 are useable to facilitate transactions between services (e.g., services 116 and 124) of various service providers (e.g., service provider 108 and service provider 112). For example, in one embodiment, a particular merchant is implemented under service 116 of service provider 108 (e.g., PAYPAL) and therefore has access credentials associated with service provider 108 (e.g., first token 530 shown in FIG. 5). In such embodiments, this particular merchant is modeled under service provider 412(2) as merchant 418.

In various embodiments, in order to complete a transaction between two different services from different service providers, the party or parties (e.g., end users such as merchants or customers) to the transaction are authenticated with both services and service providers. In various embodiments, however, the authentication systems used by these different services and service providers are different and require different information and/or information in different formats. For example, in an embodiment, service provider 108 uses a user name and a password received from the end users for authentication, and upon authenticating the end user, generates a first cryptographic access token having a first format (e.g., first token 530 shown in FIG. 5) for the transaction. In this embodiment, service provider 110 may require different information to authenticate the end user (e.g., a different user name, a different password, and a second factor authentication) and/or the second cryptographic access token required to complete the transaction (e.g., a second token 534 shown in FIG. 5) is in a different format and/or requires different information. Accordingly, in various embodiments, the hierarchical data structures 244 include multiple representations of the same end user(s) associated with different tenants and links between representations associated with the same end user.

Using the hierarchical data structures 244 maintained by MT-IDP 246 and respective 3P-IDPs (e.g., 3P-IDP 204 and 222), multi-tenant platform 102 is operable to receive the first cryptographic access token (e.g., first token 530 shown in FIG. 5) and generate the second cryptographic access token (e.g., a second token 534 shown in FIG. 5). As discussed herein, the hierarchical data structures 244 model the authentication systems of the various service providers (e.g., how an access token is usable to authenticate the transaction with the respective tenants, what information is used and in what format for the access tokens), and using these hierarchical data structures 244, multi-tenant platform 102 is operable to generate the second cryptographic access token (e.g., by adding additional information to the information received in the first cryptographic access token, putting such information in the proper format for the second cryptographic access token).

FIG. 5 is a diagram illustrating embodiments of operations for facilitating a transaction between service providers by the multi-tenant platform 102 using unified identity services. The operations of FIG. 5 are described with reference to the systems and components described in FIGS. 1-4 (for illustration purposes and not as a limitation). The example operations can be carried out by the multi-tenant platform 102 in various embodiments.

User device(s) 104 interface with merchant 501 and 503 at 500 and 502. In the embodiments shown in FIG. 5, merchant 501 is implemented via service provider 108 and merchant 503 is implemented via service provider 112. In these embodiments, such interfacing includes one or more user devices 104 accessing the respective service providers 108, 110 via the Internet (e.g., by accessing a website associated with the service providers 108, 112) and selecting merchant 501 and merchant 503 to facilitate a transaction. In various embodiments, different user devices 104 are used by different users (e.g., a first user device 104 associated with a customer interfacing with service provider 108 and a second user device 104 associated with a merchant interfacing with service provider 112). In other embodiments, the same user device 104 interfaces with both service provider 108 and service provider 112 at 500 and 502. In various embodiments, for example, at 500 a user device 104 interfaces with a website associated with merchant 501 on service provider 108 (e.g., an e-commerce website) to choose products for purchase at 500 and interfaces with merchant 503 on service provider 112 (e.g., a payment processing service) to select a payment method for the transaction (e.g., to transfer funds from the customer to the merchant to pay for the products) at 502.

While FIG. 5 includes merchants 501 and 503, the disclosed techniques are not limited to transactions involving merchants, however. In various embodiments, the merchant 501 can be any user of service provider 108 and merchant 503 can be any user of service provider 112. In various embodiments, merchant 501 and merchant 503 are linked in hierarchical data structure 244 (e.g., merchant 501 and merchant 503 are associated with the same entity). In other embodiments, merchant 501 and merchant 503 are not associated with the same entity. As discussed herein, using the techniques disclosed herein, merchant 501 is able to leverage services 116 and 124 offered by respective service providers 108 and 112 during the transaction. In various embodiments, merchant 501 receives first token 530 discussed below from service provider 108.

At 504, on behalf of merchant 501, service provider 108 interfaces with multi-tenant platform 102 via multi-tenant API 126 to request to use first service 116 and to access a second service of a different service provider (e.g., service 124 of service provider 112) to perform a transaction. In various embodiments, this interfacing includes first token 530 discussed below. Multi-tenant API 126 is illustrated three times in FIG. 5 connected by dashed lines: a first interfacing with service provider 108, service 116, and 3P-IDP 204 at 504, 510, and 506, respectively; a second interfacing with service 116 and service 124; and a third interfacing with service provider 112, service 124, and 3P-IDP 222. In various embodiments, these interfaces are implemented with multiple instances of multi-tenant API 126. In such embodiments, a first instance of multi-tenant API 126(1) is useable to facilitate communications between multi-tenant platform 102 and first service 116 and a second instance of multi-tenant API 126(2) is useable to facilitate communications between multi-tenant platform 102 and second service 124 as shown in FIG. 5. In various other embodiments, multi-tenant API 126 is implemented using separate APIs (e.g., a first multi-tenant API 126 for first service provider 108, a second multi-tenant API 126 (not shown) for second service provider 112).

At 506, multi-tenant API 126(1) interfaces with 3P-IDP 204 (i.e., the 3P-IDP 204 of service provider 108) to request exchange of first token 530 to an internal token (also referred to herein as a "security context") that is useable by multi-tenant API 126(1) make calls to the services of service provider 108 (e.g., service 116). In response to the request to exchange first token 530 with the security context for service 116, 3P-IDP 204 communicates with MT-IDP 246 at 508 to determine service provider 108 and service provider 112 are provisioned within hierarchical data structure 244 and that merchant 501 is provisioned under service provider 108 (e.g., under service provider 412(2)) and that merchant 503 is provisioned under service provider 112 (e.g., under service provider 412(3)). Further, a determination is also made whether a representation of merchant 503 is provisioned under the hierarchical data structure maintained by 3P-IDP 222. If such representations are not provisioned, 3P-IDP 204, MT-IDP 246, and/or 3P-IDP 222 work to provision the missing representations. In the embodiment shown in FIG. 5, M1' under service provider 412(2) corresponds to merchant 501 and M1' under service provider 412(3) and 3P-IDP 222 correspond to merchant 503.

As discussed herein in reference to FIGS. 3 and 4, 3P-IDP 204, 3P-IDP 222, and MT-IDP 246 generate hierarchical data structure(s) 244 associated with service providers 108, 112 and/or add nodes to existing hierarchical data structure(s) 244 associated with the transaction (e.g., by adding nodes associated with end users associated with the transaction). In various embodiments, the hierarchical data structure(s) 244 are provisioned in prior to the request for the transaction is received. In other embodiments, hierarchical data structure(s) 244 are generated during the transaction. After determining that the hierarchical data structure 244 is properly provisioned, 3P-IDP returns the security context for service 116 to multi-tenant API 126(1). Using the returned security context, multi-tenant API 126(1) calls service 116 at 510.

If merchant 503 is not provisioned under 3P-IDP 222, MT-IDP 246 sends a request for 3P-IDP 222 to provision merchant 503 under 3P-IDP 222 at 516. In response, 3P-IDP 222 provisions merchant 503 in hierarchical data structure 244 and returns to MT-IDP 246 an external-identifier correlating to the merchant 503 under 3P-IDP 222. In various instances, the actions performed at 516 only occur when the merchant 503 is not provisioned under 3P-IDP 222 and thus not performed with the same merchant 503 is invoked in subsequent transactions.

At 512, service 116 requests a universal access token 532 for the transaction from 3P-IDP 204. At 514, 3P-IDP 204 sends a request to MT-IDP 246 for a universal access token 532. In response to 514, MT-IDP 246 returns to 3P-IDP 204 a universal access token 532 as discussed below. In turn, 3P-IDP 204 sends the generated universal access token 532 to service 116.

In turn, using universal access token 532, service 116 interfaces with multi-tenant API 126(2) at 518. Multi-tenant API 126(2) sends universal access token 532 to 3P-IDP 222 at 520. 3P-IDP 222 verifies the universal access token 532 and uses it to generate a second token 534. In various embodiments, such verification and generation includes (a) accessing the hierarchical data structure(s) 244 associated with the transaction (e.g., associated with end users involved in the transaction) and (b) generating second token 534 to include information needed by service 124 to authenticate the transaction (e.g., what information should be provided in by second token 534, in what format second token 534 should be, how to interpret the various portions of by second token 534, cryptographic keys associated with second service provider 112 to decrypt and/or authenticate by second token 534, etc.).

At 522, multi-tenant API 126 calls service 124 (e.g., by calling an API for service 124) using the second access token 534 to complete the transaction. Once the transaction is completed, service 124 sends a transaction complete message to multi-tenant API 126(2) which in turn sends a transaction complete message to service 116. Service 116 then indicates that the transaction was completed to merchant 501 via multi-tenant API 126(1).

In various embodiments, first token 530 and second token 534 are external access tokens that contain security credentials for the transaction and identifies the end user(s) and end user's access privileges. In various embodiments, first token 530 is generated by a logon service of service provider 108 when an end user logs on to service provider 108 (e.g., by providing credentials) and the end user is authenticated (e.g., by comparing the provided credentials against an authentication database). As discussed herein, first token 530 is a cryptographic access token that is usable to authenticate the transaction with service provider 108 and is in a first format used by the first service 116, in various embodiments. Similarly, second token 534 is a cryptographic access token that is useable by service 124 to authenticate the transaction with service provider 112. In various embodiments, second token 534 is in a second format used by second service 124. In various embodiments, first token 530, second access token 534, and universal access token 532 are in different formats. In contrast to access tokens such as first token 530 and second token 534, in various embodiments, respective 3P-IDPs 204, 212, 222 use respective access tokens (e.g., 3P-IDP 204 uses first token 530) to generate a security context that is passed within multi-tenant platform 102 and are used to generate universal access tokens 532 as discussed herein.

In various embodiments, universal access token (UAT) 532 is a compact and self-contained object useable to securely transmit information through various components of multi-tenant platform 102 securely and to grant access to resources (e.g., resources managed by service providers 108 and 112). In various embodiments, UAT 532 is a JSON web token (JWT) that is digitally signed using one or more secrets or one or more public/private key pairs. In various embodiments, UAT 532 contains information from (or generated using) first token 530 (e.g., information extracted by 3P-IDP 204 and used to generate a security context that is in turn used to generate UAT 532) that is useable to authenticate a transaction with service provider 108 in addition to information that, when included in a second token 534, is useable to authenticate the transaction with service provider 112. In various embodiments, UAT 532 is a JWT as defined by RFC 7519 published by the Internet Engineering Task Force (IETF) dated May 2015. As discussed herein, using UAT 532, multi-tenant platform 102 is operable to exchange tokens (e.g., first token 530 and second token 534) from one domain to another (e.g., from service provider 108 to service provider 112).

In various embodiments, UAT 532 includes a header that identifies the UAT 532 (e.g., by identifying the type of token as a JWT, by indicating the signing algorithm used), a payload, and a signature. In various embodiments, the signature is used to verify that UAT 532 was not altered during transmission. In embodiments in which UAT 532 is signed with a private key, the signature can also verify that identity of the sender of UAT 532. The payload of UAT 532 contains the information used to authenticate the transaction with service provider 108 and service provider 112. In various embodiments, the payload includes an issuer indication of the tenant that requested the transaction (e.g., service provider 108), an audience indication of the tenant that is receiving the transaction (e.g., service provider 112), and indicators associated with the transaction. In various embodiments, such transaction indicators of the end users include first tenant payload information including a first indication of a first end user within first service 116 (e.g., an indicator of merchant 501) and second tenant payload information including a second indication of the first end user within the second service 124 (e.g., an indicator of merchant 503). For example, this first indication and second indication identify an entity selling products to a customer of the transaction in both first service 116 (e.g., an indicator of merchant 501, an indicator of the products sold) and second service 124 (e.g., an indicator of merchant 503, an indicator of an account to receive resources for the same). In some of such embodiments, the payload also includes a third indication of a second end user within first service 116 and/or second service 124 to identity the customer of the transaction.

In various embodiments, the format of the UAT 532 is independent of the formats of access tokens used by any of the tenants of multi-tenant platform 102. Accordingly, if multi-tenant platform 102 received an additional request from the first service 116 to access a third service (e.g., service 124) of a third tenant of the multi-tenant system (e.g., service provider 112) to perform an additional transaction, the UAT 532 generated to facilitate the additional transaction would have the same format as the UAT 532 shown in FIG. 5. Because in various embodiments the format of the tokens (and the authentication method) used by the respective services providers is proprietary, exchanging the various tokens between domains using a UAT 532 allows the multi-tenant platform 102 to accommodate new tenants (and facilitate transactions between them) in a more scalable way. The resources used to on-board a new tenant and/or set up a new interface between services of different tenants are reduced because rather than adding conversion algorithms between the token used by the new tenant or new service and the various other tenants and services, the new tenant merely can set up a conversion algorithm between its token and UAT 532. For example, if a multi-tenant platform 102 includes five tenants that have their own services, facilitating transactions between all five services would require ten conversion algorithms (e.g., first service to second service, first service to third service, second service to third service, etc.). In contrast, if the tokens used by the respective services are exchanged via UAT 532 as described herein, only five conversion algorithms are required (e.g., first service to UAT 532, second service to UAT 532).

Figure 6A:
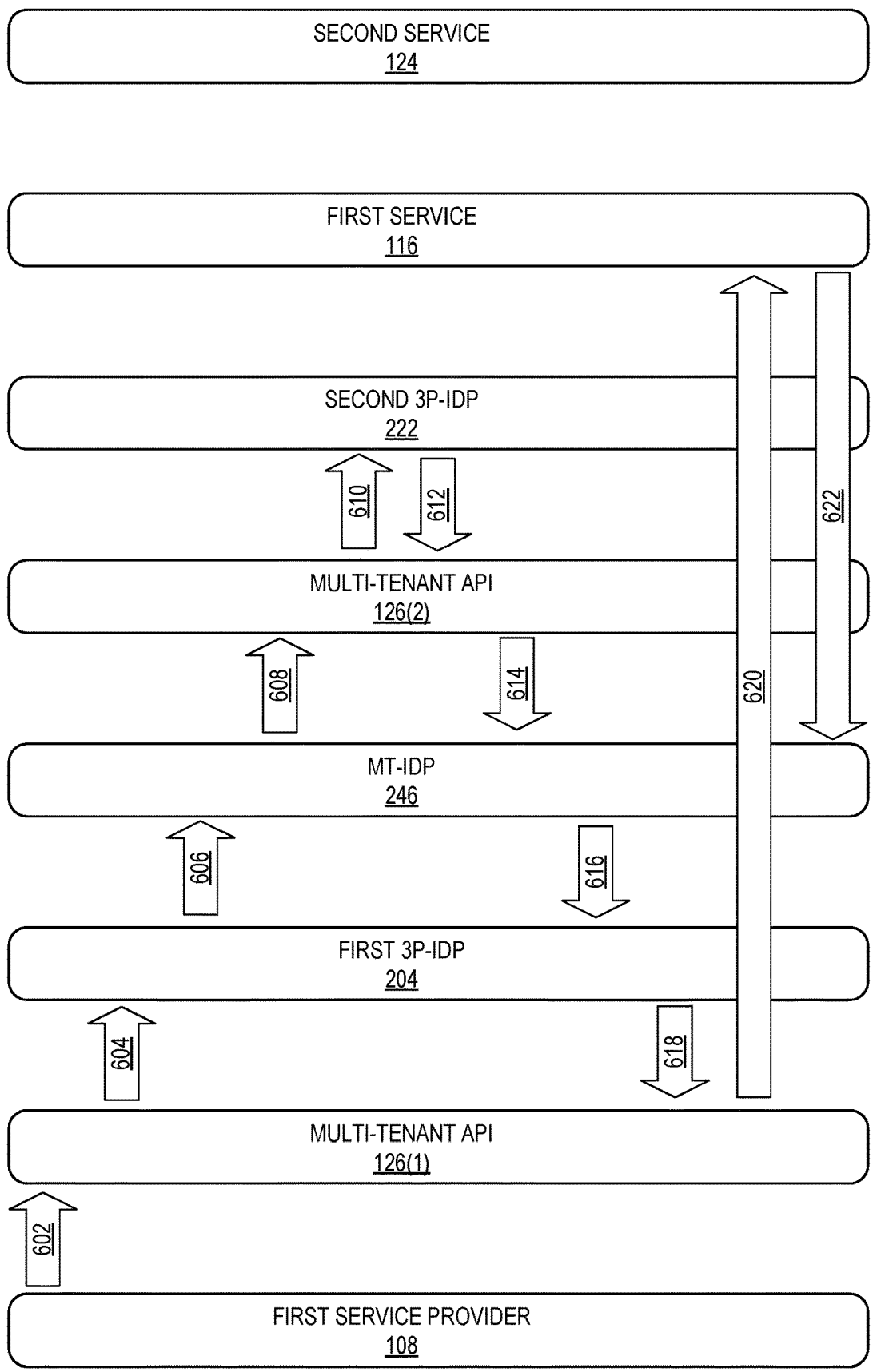
FIGS. 6A and 6B are flow diagrams illustrating embodiments of operations for facilitating a transaction between services of tenants of a multi-tenant platform.
Figure 6B:
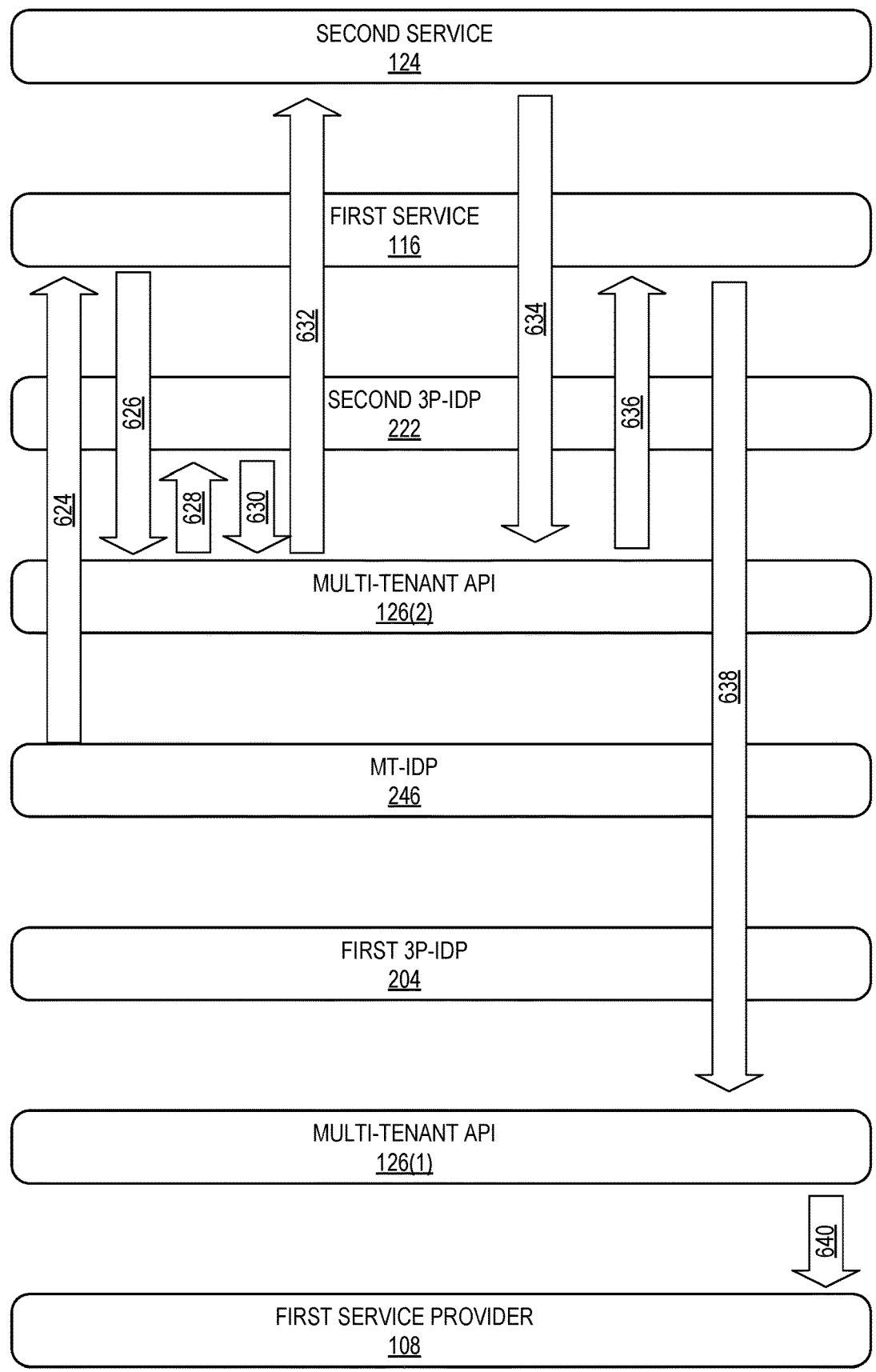

FIGS. 6A and 6B are flow diagrams illustrating embodiments of operations of a method 600 using multi-tenant platform 102 to facilitate transactions between services of different tenants. The method 600 of FIGS. 6A and 6B is described with reference to the systems and components described in FIGS. 1-5 (for illustration purposes and not as a limitation). The example operations can be carried out by the multi-tenant platform 102. In the embodiment shown in FIGS. 6A and 6B, the hierarchical data structure(s) 244 are generated (at arrows 604-618) for use in the transaction after the request for the transaction has been received (at arrow 602), but in other embodiments the hierarchical data structure(s) 244 and the information contained therein may be provisioned prior to the request to perform the transaction being received (at arrow 602). In FIGS. 6A and 6B, multi-tenant API 126 is represented in two instances: 126(1) and 126(2) as discussed here. As discussed above, however, in other embodiments, multiple, separate multi-tenant APIs 126 are used. Further, method 600 is performed in a context in which the hierarchical data structure 244 has not been fully provisioned for the transaction, but in other instances the hierarchical data structure 244 has already been generated, and thus certain tasks may be omitted in embodiments. In still other embodiments, a UAT 532 for a first transaction has been retained and is reused for a second transaction, and thus certain tasks can be omitted.

In the embodiment shown in FIGS. 6A and 6B, first service provider 108 is an e-commerce platform (e.g., used by customers to select items for purchase from merchants via an e-commerce service 116) and second service provider 112 is a payments processing platform (e.g., used by customers to securely store funding instruments such as credit card accounts and use them for payments during the checkout). These techniques, however, are not limited to financial transactions and could be used to perform a transaction in which computer files (e.g., electronic medical records, media files) are securely transferred from a first storage service to a second storage service, for example.

At arrow 602, first service provider 108 calls the multi-tenant API 126(1) with an access token (e.g., first token 530) as part of a request to perform a transaction to purchase products. At arrow 604, multi-tenant API 126(1) communicates with first 3P-IDP 204 (i.e., 3P-IDP of service provider 108) to begin generation of a hierarchical data structure 244 for service provider 108 and service provider 112. At arrow 606, first 3P-IDP 204 communicates with MT-IDP 246 to generate merchant representations (e.g., representations 224(1) and 224(2) shown in FIG. 4) for one or more merchants in the transaction within hierarchical data structure 244 on behalf of both first service provider 108 and second service provider 112. At arrows 608 and 610, MT-IDP 246 communicates with second 3P-IDP 222 via multi-tenant API 126 to provision one or more light weight merchants (e.g., light-weight merchants 420(1) and 420(2) associated with representations 224(1) and 224(2) as shown in FIG. 4) and then returns at arrow 612. At arrow 614, multi-tenant API 126 communicates information (e.g., an external ID) representing the merchants (e.g., lightweight merchants 420(1) and 420(2)) to MT-IDP 246 to include in the UAT 532. At arrow 616, MT-IDP 246 communicates the generated hierarchical data structure 244 to first 3P-IDP 204. At arrow 618, 3P-IDP 204 returns the security context useable to access service 116 for the transaction to multi-tenant API 126(1).

At arrow 620, multi-tenant API 126(1) call first service 116 using the security context. At arrow 622, first service 116 sends a request to MT-IDP 246 to translate the access token from first service provider 108 (e.g., first token 530) to a UAT 532. At arrow 624, after generating the UAT 532 using the hierarchical data structure 244, MT-IDP 246 sends UAT 532 (including the payload information for the transaction) to first service 116.

At arrow 626, first service 116 sends UAT 532 to multi-tenant API 126(2) so an access token for second service provider 112 (e.g., second token 534) can be generated. At arrow 628, multi-tenant API 126(2) sends UAT 532 to second 3P-IDP 222 (i.e., 3P-IDP of service provider 112) to validate UAT 532 and to generate second token 534. At arrow 630, second 3P-IDP 222 communicates with multi-tenant API 126(2) and indicates that the validation of UAT 532 was successful and second token 534 was successfully generated. At arrow 632, multi-tenant API 126(2) uses second token 534 to communicate with second service 124 (e.g., via an API call to second service 124) to perform the transaction (e.g., to transfer financial resources from a customer to a merchant to pay for purchased products). At arrow 634, second service 124 returns to multi-tenant API 126(2) (e.g., at an API gateway for second service 124). At arrow 636, multi-tenant API 126(2) returns to first service 116. At arrow 638, first services 116 returns to multi-tenant API 126(1) (e.g., at an API gateway for first service 116). At arrow 640, multi-tenant API 126(1) returns to first service provider 108 completing the transaction operation.

Figure 7:
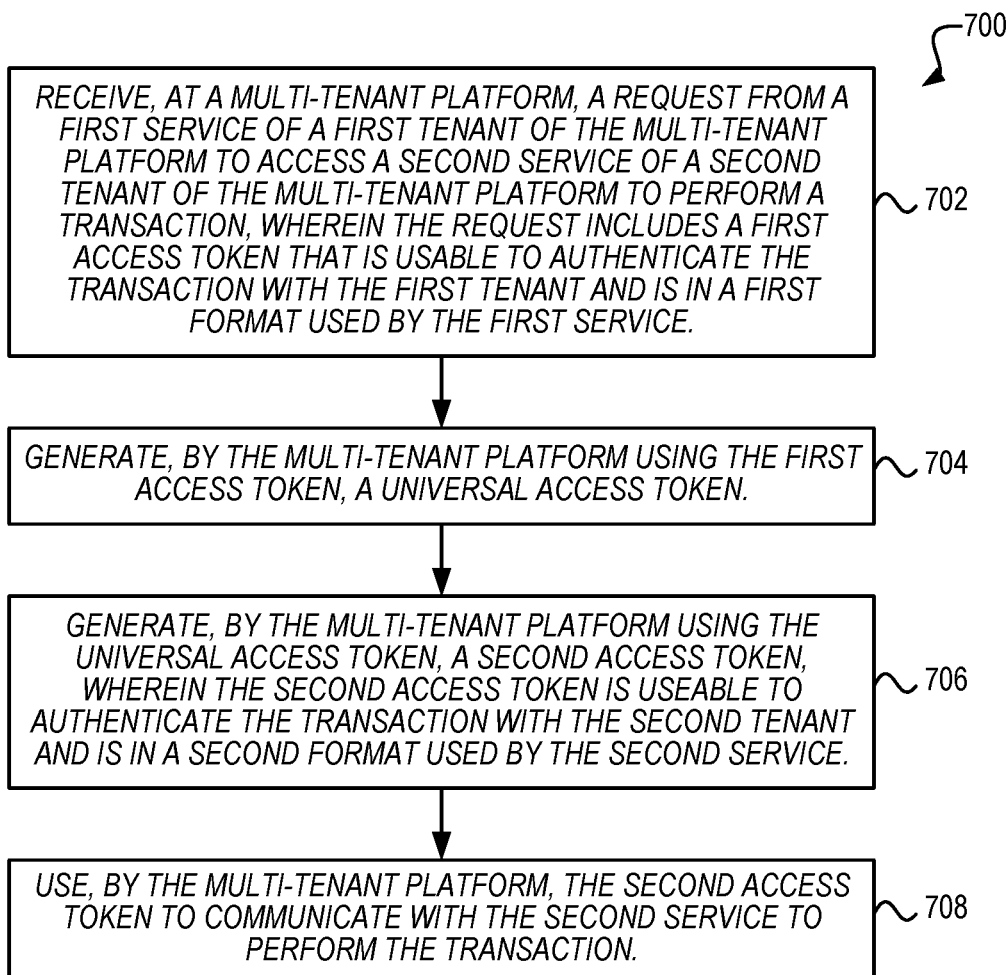
FIG. 7 is a flow diagram illustrating an embodiment of a transaction method in accordance with the disclosed embodiments.

Referring now to FIG. 7, a flow diagram depicting a transaction method 700 is depicted. In the embodiment shown in FIG. 7, the various actions associated with method 700 are implemented by multi-tenant platform 102. At block 702, multi-tenant platform receives a request from a first service (e.g., service 116) of a first tenant of the multi-tenant platform 102 (e.g., service provider 108) to access a second service (e.g., service 124) of a second tenant of multi-tenant platform 102 (e.g., service provider 112) to perform a transaction. The request includes a first access token (e.g., first token 530) that is usable to authenticate the transaction with the first tenant (e.g., service provider 108) and is in a first format used by the first service (e.g., service 116). At block 704, multi-tenant platform 102 generates, using the first access token (e.g., first token 530), a universal access token 532. At block 706, multi-tenant platform 102 generates, using universal access token 532, a second access token (e.g., second token 534). The second access token is useable to authenticate the transaction with the second tenant (e.g., service provider 112) and is in a second format used by the second service (e.g., service 124). At block 708, multi-tenant platform 102 uses the second access token (e.g., second token 534) to communicate with the second service (e.g., service 124) to perform the transaction.

It should be understood that FIGS. 1-7 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIG. 5, 6A, 6B, or 7 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 8:
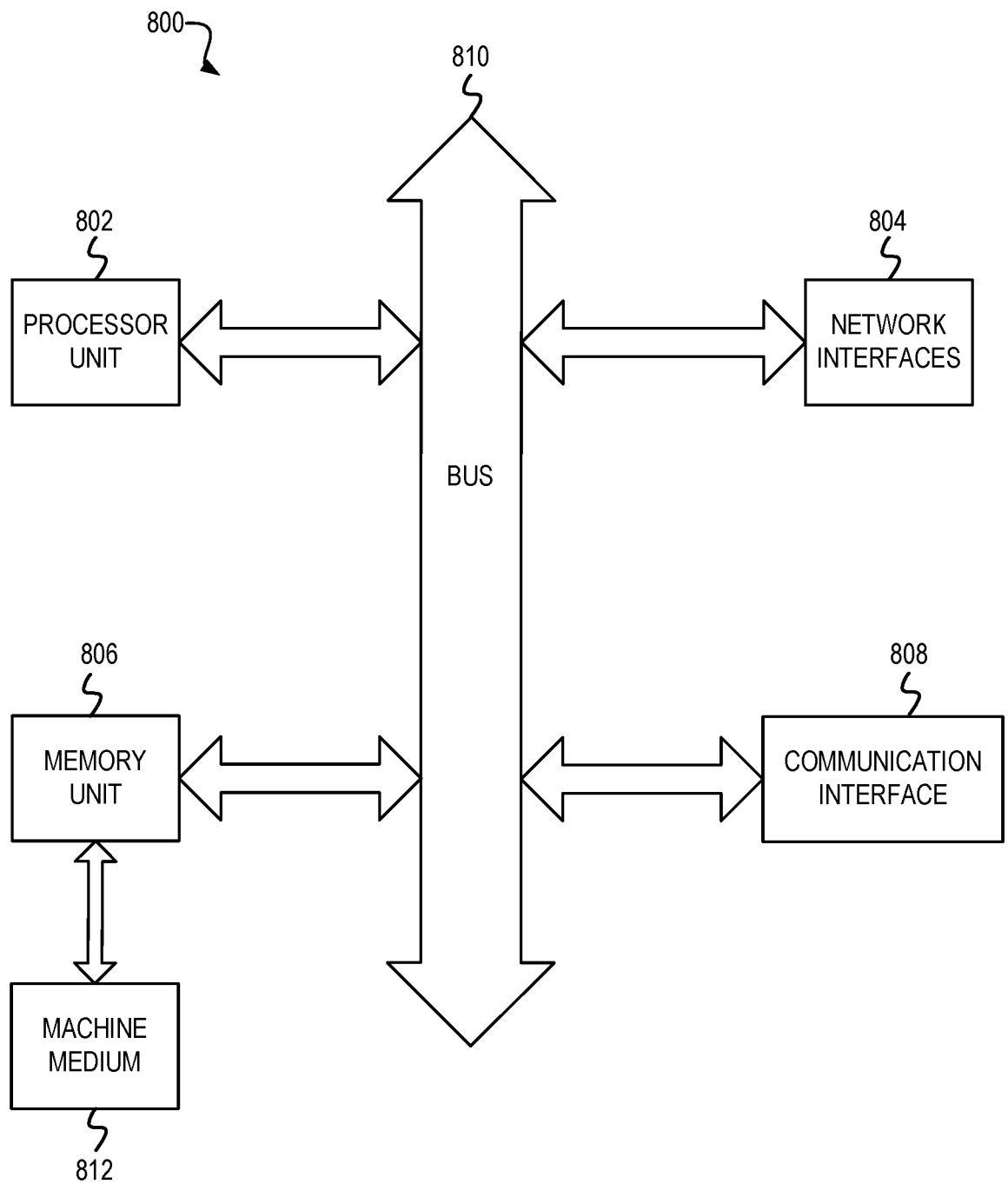
FIG. 8 is a block diagram illustrating embodiments of electronic devices used in the communication systems of FIGS. 1-7.

FIG. 8 is a block diagram of one embodiment of an electronic device 800 used in the communication systems of FIGS. 1-6. In some implementations, the electronic device 800 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 800 can include a processor unit 802 (possibly including multiple processors, multiple cores, multiple nodes, and/or implementing multi-threading, etc.). The electronic device 800 can also include memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 can also include a bus 810 (e.g., PCI, ISA, PCI-Express, HyperTransport®, InfiniBand®, NuBus, AHB, AXI, etc.), and network interfaces 804 can include wire-based interfaces (e.g., an Ethernet interface, a powerline communication interface, etc.). The electronic device 800 includes a communication interface 808 for network communications. The communication interface 808 can include at least one of a wireless network interface (e.g., a WLAN interface, a Bluetooth interface, a WiMAX interface, a ZigBee interface, a Wireless USB interface, etc.), In some implementations, the electronic device 800 may support multiple network interfaces—each of which is configured to couple the electronic device 800 to a different communication network.

The memory unit 806 can embody functionality to implement embodiments described in FIGS. 1-6 above. In one embodiment, the memory unit 806 can include one or more of functionalities for using unified identity services in a multi-tenant architecture system. Any one of these functionalities may be partially (or entirely) implemented in hardware and/or on the processor unit 802. For example, some functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, memory unit 806, the network interfaces 804, and the communication interface 808 are coupled to the bus 810. Although illustrated as being coupled to the bus 810, the memory unit 806 may be coupled to the processor unit 802.

While the embodiments are described with reference to various implementations and exploitations, it will be understood that these embodiments are illustrative and that the scope of the present disclosure is not limited to them. In general, techniques for using unified identity services in a multi-tenant architecture system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method, comprising:
receiving, at a multi-tenant platform from a first service of a first tenant of the multi-tenant platform, a request to access a second service of a second tenant of the multi-tenant platform to perform a transaction, wherein the request includes a first access token that is usable to authenticate the transaction with the first tenant and is in a first format used by the first service;
based on the first access token, generating, by the multi-tenant platform, a universal access token that includes information usable to authenticate the transaction with the first service and the second service, wherein generating the universal access token comprises using a first identity provider model corresponding to the first tenant and including a first representation of an end user associated with the transaction;
exchanging, by the multi-tenant platform, the universal access token for a second access token that is usable to authenticate the transaction with the second tenant, including by:
sending the universal access token to an identity provider associated with the second tenant; and
receiving from the identity provider associated with the second tenant, the second access token, wherein the second access token is in a second format used by the second service, the second access token is generated using a second identity provider model corresponding to the second tenant and including a second representation of the end user, and the first identity provider model and second identity provider model are represented within a hierarchical data structure that links the first representation and second representation together; and
using, by the multi-tenant platform, the second access token to communicate with the second service to perform the transaction.

2. The method of claim 1, wherein the universal access token includes:
a header that identifies the universal access token;
a payload including:
an issuer indication of the first tenant, and
an expiration time that limits a time period during which the universal access token is useable; and
a cryptographic signature.

3. The method of claim 2,
wherein the payload further includes:
first tenant payload information including the first representation of the end user within the first service; and
second tenant payload information including the second representation of the end user within the second service.

4. The method of claim 1,
receiving, at the multi-tenant platform, an additional request from the first service to access a third service of a third tenant of the multi-tenant platform to perform an additional transaction, wherein the additional request includes an additional first access token that is usable to authenticate the transaction with the first tenant and is in the first format used by the first service; and
generating, by the multi-tenant platform using the additional first access token, an additional universal access token having the same format as the universal access token.

5. The method of claim 1,
wherein the first identity provider model models how the first access token is usable to authenticate the transaction with the first tenant; and
wherein the second identity provider model models how the second access token is usable to authenticate the transaction with the second tenant.

6. The method of claim 1,
the method further comprising:
determining that the end user is authorized to access the first service and access the second service.

7. The method of claim 1, further comprising:
provisioning, with the multi-tenant platform, a first application program interface (API) to facilitate communications between the multi-tenant platform and the first service; and
provisioning, with the multi-tenant platform, a second API to facilitate communications between the multi-tenant platform and the second service;
wherein receiving the request from the first service includes using the first API, and wherein using the second access token to communicate with the second service includes using the second API.

8. The method of claim 1, wherein the universal access token is generated for the transaction and is not used for any subsequent transactions.

9. A non-transitory, computer-readable medium storing instructions that when executed by a multi-tenant platform cause the multi-tenant platform to perform operations comprising:
receiving, at the multi-tenant platform, a request from an end user of a first service of a first tenant of the multi-tenant platform for the first service to access a second service of a second tenant of the multi-tenant platform to perform a transaction, wherein the request includes a first access token that is associated with the end user;

based on the first access token generating, by the multi-tenant platform, a universal access token associated with the end user, wherein generating the universal access token comprises using a first identity provider model including a first representation of the end user;

exchanging, by the multi-tenant platform, the universal access token for a second access token that is associated with the end user, including by:

sending the universal access token to an identity provider associated with the second tenant; and receiving from the identity provider associated with the second tenant, the second access token that is associated with the end user, wherein the second access token is generated using a second identity provider model including a second representation of the end user, and the first identity provider model and second identity provider model are represented within a hierarchical data structure linking together the first representation and second representation; and using, by the multi-tenant platform, the second access token to communicate with the second service to perform the transaction;

wherein the first access token, second access token, and universal access tokens are in different formats.

10. The computer-readable medium of claim 9, wherein the universal access token includes:

a header that identifies the universal access token;

a payload including:

an issuer indication of the first tenant that requested the transaction, and an expiration time that limits a time period during which the universal access token is useable; and a cryptographic signature.

11. The computer-readable medium of claim 10, wherein the payload further includes:

first tenant payload information including the first representation of the end user within the first service; and second tenant payload information including the second representation of the end user within the second service.

12. The computer-readable medium of claim 9, the operations further comprising:

determining that the end user is authorized to access the first service and access the second service.

13. The computer-readable medium of claim 9 wherein the first identity provider model is associated with the first tenant and the second identity provider model is associated with the second tenant.

14. A multi-tenant platform, comprising:

a computer processor circuit; and a computer-memory storing instructions that when executed by the computer processor circuit cause the multi-tenant platform to perform operations comprising:

receiving, at the multi-tenant platform, a request from a first service of a first tenant of the multi-tenant platform for the first service to access a second service of a second tenant of the multi-tenant platform, wherein the request includes a first access token;

based on the first access token, generating a universal access token that includes information usable to authenticate a transaction with the first service and the second service, wherein generating the universal access token comprises using a first identity provider model including a first indication of an end user associated with the transaction;

exchanging the universal access token for a second access token associated with the second tenant, including by:

sending the universal access token to an identity provider associated with the second tenant; and receiving, from the identity provider associated with the second tenant, the second access token, wherein the second access token is generated using a second identity provider model including a second indication of the end user, and the first identity provider model and second identity provider model are represented within a hierarchical data structure linking together the first indication and second indication; and sending a program call that includes the second access token to the second service of the second tenant.

15. The multi-tenant platform of claim 14, wherein the universal access token includes:

a header that identifies the universal access token;

a payload including:

an issuer indication of the first tenant associated with the request, and an expiration time that limits a time period during which the universal access token is useable; and a cryptographic signature.

16. The multi-tenant platform of claim 15, wherein the payload further includes:

first tenant payload information including the first indication of the end user within the first service; and second tenant payload information including the second indication of the end user within the second service.

17. The multi-tenant platform of claim 14, wherein the first identity provider model is associated with the first tenant and the second identity provider model is associated with the second tenant.

18. The multi-tenant platform of claim 14, the operations further comprising:

sending, from the multi-tenant platform to the first service, the universal access token.

* * * * *